E. J. LEES.
METHOD OF GENERATING THE TEETH OF HELICAL GEAR WHEELS.
APPLICATION FILED NOV. 4, 1912.
1,202,074.  Patented Oct. 24, 1916.
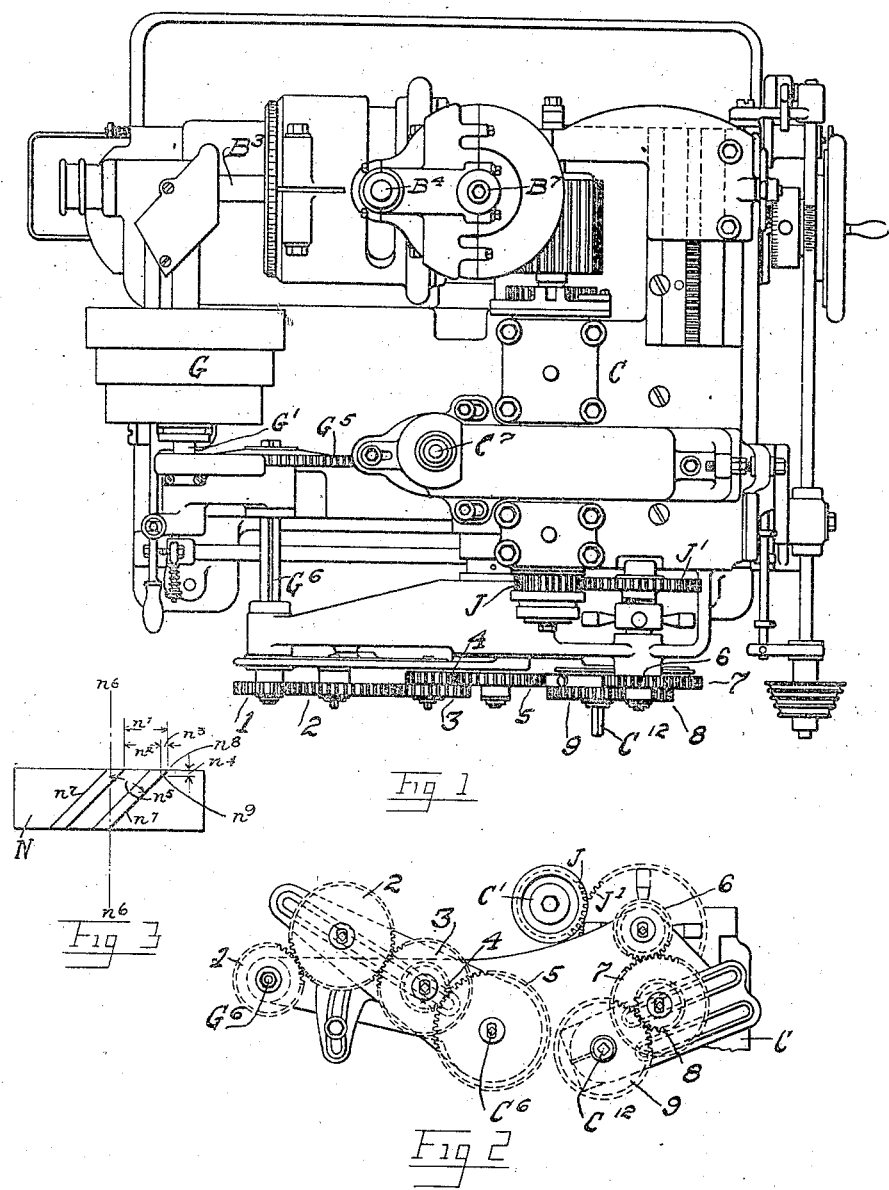
Witnesses
Inventor
Ernest J. Lees
By
his Attorney

UNITED STATES PATENT OFFICE.

ERNEST J. LEES, OF CLEVELAND, OHIO.

METHOD OF GENERATING THE TEETH OF HELICAL GEAR-WHEELS.

1,202,074.

Specification of Letters Patent.

Patented Oct. 24, 1916.

Application filed November 4, 1912. Serial No. 729,400.

*To all whom it may concern:*

Be it known that I, ERNEST J. LEES, a citizen of the United States, residing at 6210 Carnegie avenue, Cleveland, in the county of Cuyahoga and State of Ohio, have invented a new and useful Improvement in Methods of Generating the Teeth of Helical Gear-Wheels, of which the following is a specification, the principle of the invention being herein explained and the best mode in which I have contemplated applying that principle, so as to distinguish it from other inventions.

My invention relates to a method of generating the teeth of helical gear wheels through the agency of a helical or hob cutter and may be carried out by certain of the mechanism shown, described, and claimed in my co-pending application upon a gear generator filed August 6th, 1909, Serial Number 511,497, and specifically by that shown in Figures 3 and 11 thereof.

To cut helical teeth on a gear blank with a cutter of the hob type (helically arranged generating cutter) in a machine as herein described, it is necessary that there should be a determined ratio between the rotation of the cutter, the rotation of the gear blank, and the feed of the work or blank across the cutter in a line parallel with the axis of the blank.

Fig. 1 is a top plan of a gear generator suitable for carrying out my inventive method. Fig. 2 is an end view of the same, showing both the rotation and the feed change gears. Fig. 3 is a diagrammatic view of a helical gear used to describe and formulate the cutting of a helical gear by my method.

I prefer to use a method based on the following explanation with reference to Fig. 3 where "N" is a diagram of a side elevation of a helical gear, "$n^7$ $n^7$" are two adjacent teeth in the gear, "$n^1$" is the circular pitch of the gear at the pitch line and is composed of a tooth and a space, and equals the pitch circumference divided by the number of teeth in the gear, "$n^2$" and "$n^3$" are fractional parts of "$n^1$", "$n^4$" is the feed of the work across the cutter to every revolution of the blank, "$n^5$" is the angle of the teeth with the axis "$n^6$" of the gear "N", "$n^8$" is the intersection of one edge of the tooth with the edge of the gear blank, and "$n^9$" is the intersection of "$n^4$" with the edge of the tooth.

Before describing this method, an example of a gear taken in connection with diagram of Fig. 3 will make it clear. It is understood that a single thread cutter is being used, the gear to be of the following dimensions: twenty teeth; one inch circular pitch: 45° angle of teeth with axis.

Referring again to Fig. 3, it is very evident that if the cutter should start to cut at "$n^8$", by the time it had reached the point "$n^9$", the blank "N" would have to revolve more than one revolution, providing of course we are cutting a right hand gear with a right hand cutter. It is equally obvious that where it is desired to cut a left hand helical gear with a left hand cutter, the formula used is the same, the machine of course being geared up in such event to rotate the blanks in the opposite direction, while to cut a right hand gear with a left hand cutter the rotation of the blank is slowed down instead of increased. An example of this, assuming we are to cut a twenty tooth gear with a one inch circular pitch and a 45° angle right hand, is accomplished by gearing up the machine to cut twenty and one-eighth (20⅛) teeth per rotation and at the same time gearing up the machine to feed one-eighth (⅛) per revolution.

It is very evident that nineteen and seven-eighths (19⅞) teeth are less than twenty (20) teeth, and that in a machine of this type to cut spur gears the cutter and blank revolve at a ratio corresponding to the number of teeth to be cut. It is also evident then that a gear with nineteen and seven-eighths (19⅞) teeth will rotate faster than a gear with twenty (20) teeth. Therefore, if we gear up the machine to cut nineteen and seven-eighths (19⅞) teeth, the blank will be rotated one-eighth of the circular pitch "$n^1$" faster than it would if we were cutting spur gears, and as was stated, there must be a ratio between rotation and feed; then it is evident that "$n^3$" equals one-eighth (⅛) inch and as "$n^5$" is 45°, then "$n^4$" will equal one-eighth (⅛) inch. Therefore gearing up the rotation of this blank for nineteen and seven-eighths (19⅞) teeth with one-eighth (⅛) feed, the cutter will generate a spiral gear with twenty (20) teeth one inch circular pitch 45° angle. It is very evident that on any other angle outside of 45° the ratio between "$n^3$" and "$n^4$" will not be one to one, as in this case, therefore it is necessary to follow a fixed formula to determine the rotation and the feed. The following data must be known: number of teeth in gear to be cut; normal pitch; circular pitch $= n^1$; angle of teeth with axis $= n^5$; tangent of angle of teeth; co-tangent of angle of teeth; cosine of angle of teeth. This information is used in conjunction with formulæ as follows:

$$\frac{1}{\text{tangent of } n^5 \times \text{approximate feed}} = n^3 \text{ or approximate fractional part of tooth.}$$

The rotation should be geared up to the number of teeth to be cut minus the nearest available even fractional part to $n^3$ which can be expressed as a mixed number.

Having now decided the rotation, the formula for the feed is:

$$\frac{n^1}{\frac{n^1}{n^3}} \times \text{cotangent of angle} = \text{approximate feed or } n^4.$$

Some figure with which it is easy to compute is generally assumed for the factor $n^3$ which latter approximately determines the feed $n^4$. This formula does not differ from the example already given, since it was the circumstance of the example given having an angle of 45° which made it possible to determine the ratio of $n^3$ to $n^4$ mentally, hence following the formula, the cotangent of 45° being one, the result is the same.

The operation of this machine is as follows: The cone pulley "G" supplies the rotation or power to the machine. The shaft "G¹" is driven by cone "G" and in turn drives shaft "B³" which in turn drives shaft "B⁴" which in turn drives "B⁷" which is the cutter spindle driving the cutter which generates the teeth in the gear blank. The shaft "G¹" meanwhile drives the gear "G⁵" which in turn drives shaft "G⁶."

A change gear 1 is fastened on shaft "G⁶" and drives gear 2 which in turn drives gear 3. Fastened to gear 3 is gear 4 which in turn drives gear 5. This last mentioned gear 5 drives shaft "C⁶" which in turn drives the worm shaft "C⁷," and this latter drives the index worm wheel on the work spindle "C¹" which in turn drives the gear blanks to be cut.

The spindle "C¹" has fastened to it gear (J) which in turn drives gear "J¹." The gear "J¹" through the medium of a suitable clutch drives a shaft on which the gear 6 is fastened, and this gear 6 then drives gear 7, which in turn drives gear 8, which again in turn drives gear 9, which drives the screw C¹², which feeds the work slide "C" imparting the feed motion to the main spindle "C¹" and to the gear blanks to be cut parallel to the axis of the gears.

The application of the foregoing formula to the machine may be as follows: To set up the machine to cut a helical gear of the dimensions called for in the example already given namely: twenty (20) teeth; one inch circular pitch; 45° angle of teeth with axis. Arrange gears 1, 2, 3, 4, 5, so that while the cutter moves through twenty revolutions, the gear blanks will have gone one revolution plus one-eighth ($\frac{1}{8}$) of the circular pitch; or in other words gear up the rotation to cut nineteen and seven-eighths (19$\frac{7}{8}$) teeth. As for the feed, arrange gears 6, 7, 8 and 9 so that while the work spindle goes one revolution the work slide "C" will travel one eighth ($\frac{1}{8}$) of an inch parallel to the axis of the gears to be cut.

It will be noticed that while the normal pitch and cosine of the angle are both required to be known, no mention has been made of their function which is as follows: A helical gear is often specified by normal circular pitch and not circular pitch. In this case the circular pitch is found in the following manner: Divide normal circular pitch by cosine of angle and the result will equal circular pitch or "$n^1$" which is a quantity that must be known.

Having now fully described my invention, what I claim and desire to secure by Letters Patent is:

A method of generating the teeth of helical gear wheels having different numbers of teeth, consisting in rotating a gear blank and helical cutter with relative speeds through a single, continuous and unvarying motion from a driver to said various gear blanks and cutter respectively, said relative rotations being determined by the ratio of the number of teeth of each gear to be cut to the number of threads in the cutter plus or minus a proportionate constant increment; and imparting a fixed proportionate feeding motion, according to the number of teeth in the blank which is being operated upon, substantially parallel to the axis of and relative to the rotation of the particular gear blank whereby to maintain a constant angle in producing helical teeth on said blanks that have a directrix coinciding with the axes of the gear blanks.

Signed by me, this first day of November, 1912.

ERNEST J. LEES.

Attested by—
  LYNN E. MUELLER,
  H. F. LEICK.